United States Patent [19]
Klimt et al.

[11] Patent Number: 5,330,035
[45] Date of Patent: Jul. 19, 1994

[54] HOLDING DOWN SPRING FOR SPOT-TYPE DISC BRAKES AND ASSOCIATED HOUSING AND BRAKE SHOES

[75] Inventors: Ulrich Klimt, Gross-Umstadt; Georg Halasy-Wimmer, Eschborn; Helmut Ruckert, Reinheim; Matthias Jakob, Frankfurt am Main, all of Fed. Rep. of Germany

[73] Assignee: Alfred Teves GmbH, Frankfurt Am Main, Fed. Rep. of Germany

[21] Appl. No.: 730,803
[22] PCT Filed: Nov. 13, 1990
[86] PCT No.: PCT/EP90/01940
  § 371 Date: Jul. 24, 1991
  § 102(e) Date: Jul. 24, 1991
[87] PCT Pub. No.: WO91/08401
  PCT Pub. Date: Jun. 13, 1991

[30] Foreign Application Priority Data
Nov. 24, 1989 [DE] Fed. Rep. of Germany ....... 3938881
Jul. 6, 1990 [DE] Fed. Rep. of Germany ....... 4021566

[51] Int. Cl.⁵ .............................................. F16D 65/38
[52] U.S. Cl. .............................. 188/73.36; 188/73.38; 188/250 E
[58] Field of Search ............... 188/250 E, 72.3, 73.35, 188/73.36, 73.37, 73.38

[56] References Cited

U.S. PATENT DOCUMENTS

| | | | |
|---|---|---|---|
| 3,841,444 | 10/1974 | Baum et al. | 188/72.3 |
| 4,394,891 | 7/1983 | Oshima | 188/73.38 |

FOREIGN PATENT DOCUMENTS

| | | | |
|---|---|---|---|
| 2252156 | 5/1974 | Fed. Rep. of Germany | 188/73.38 |
| 3806315 | 9/1989 | Fed. Rep. of Germany | 188/73.38 |
| 0102834 | 6/1983 | Japan | 188/73.38 |

Primary Examiner—Robert J. Oberleitner
Assistant Examiner—Lee W. Young
Attorney, Agent, or Firm—Robert P. Seitter; J. Gordon Lewis

[57] ABSTRACT

Various forms of a disc brake hold down spring are disclosed, the spring having two legs disposed in a V-shape and being elastically swingable in respect of each other. In a first form, the legs extend axially and are each formed with a wing loop with one side of the wing being lockable in an undercut opening in the housing while the opposite wing side engages the backplate of at least one brake show. In a second form, the legs extend circumferentially have ends engaging the brake shoes, with a central section received in a brake housing guide opening.

20 Claims, 11 Drawing Sheets

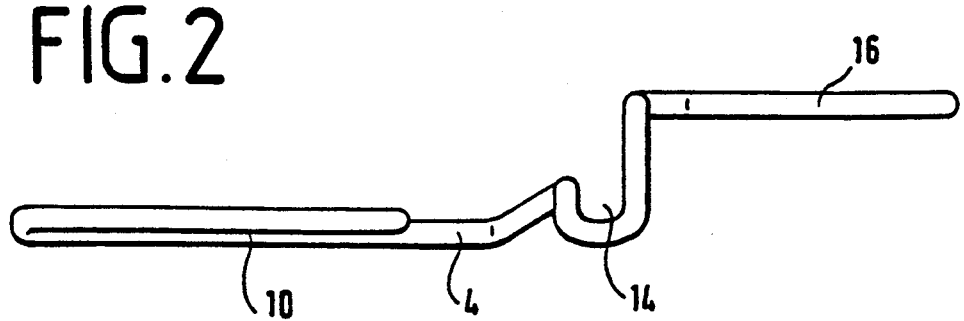
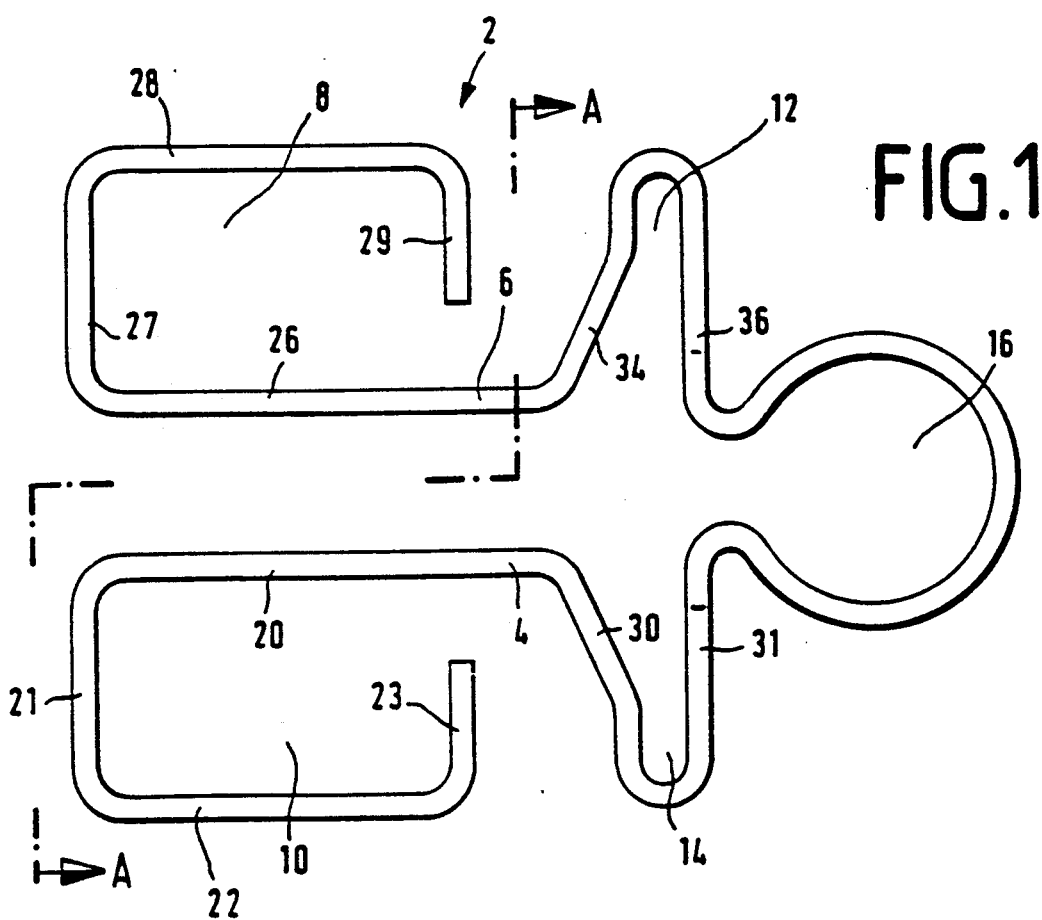
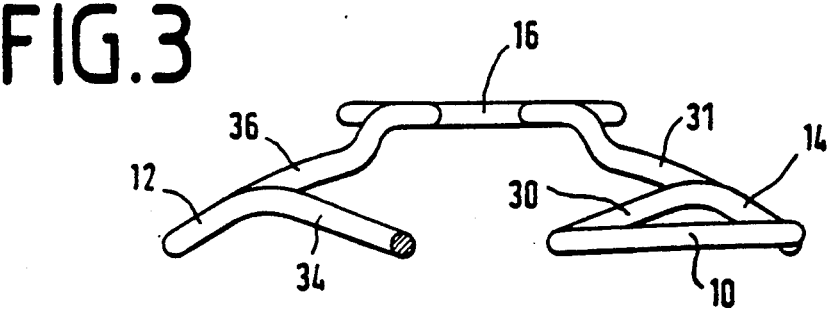

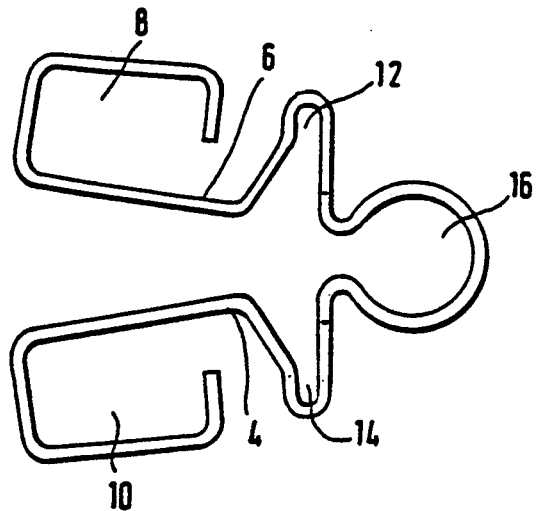
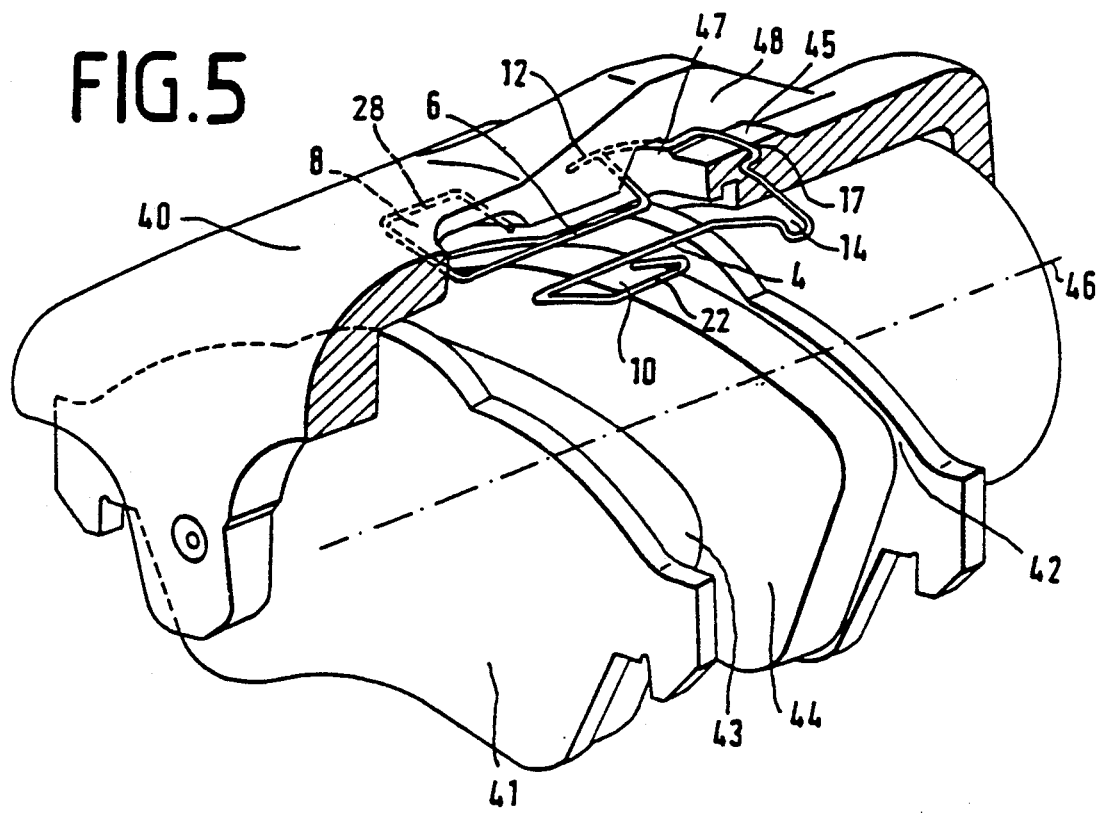

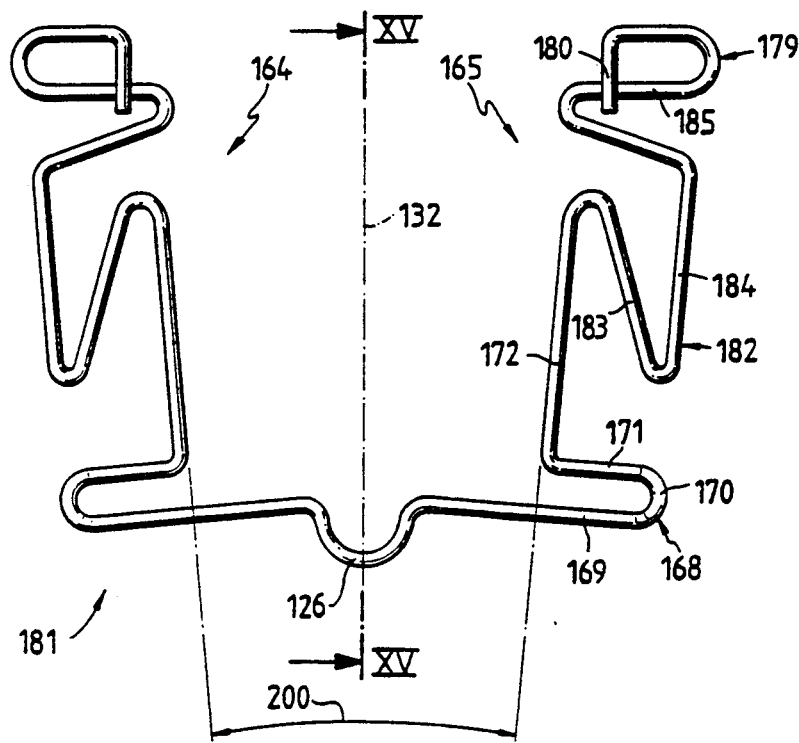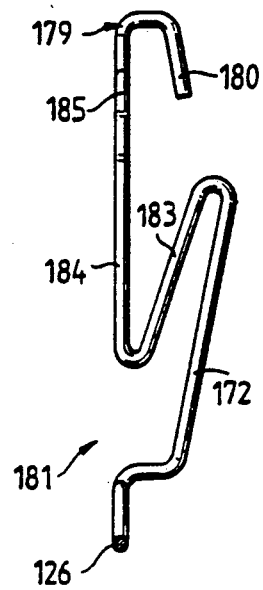

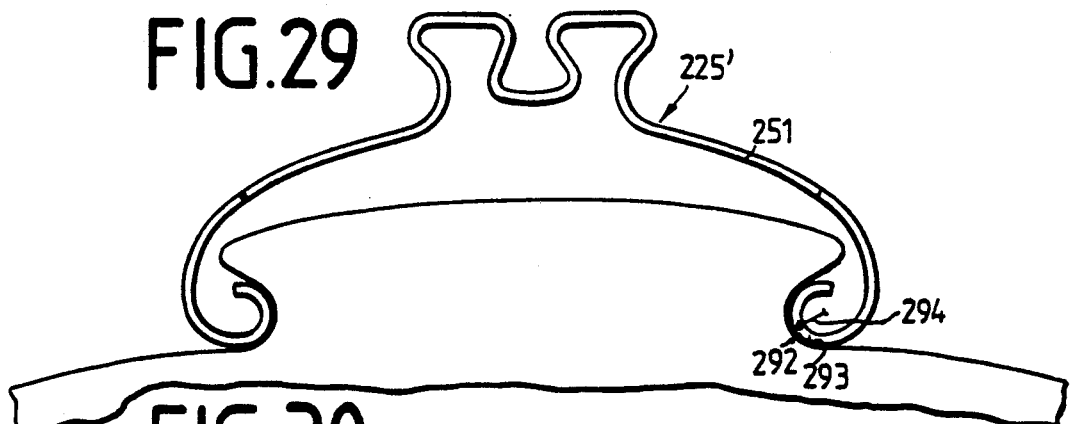
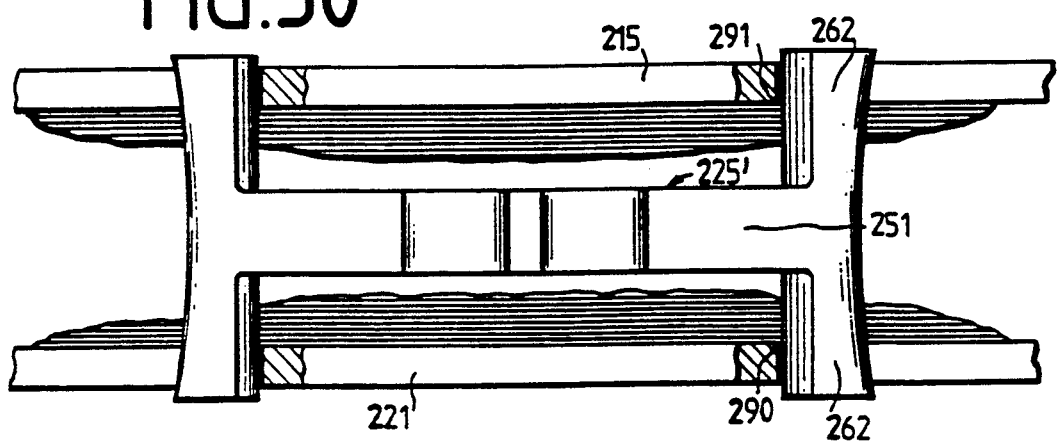
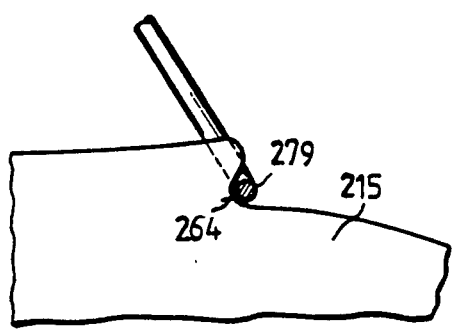
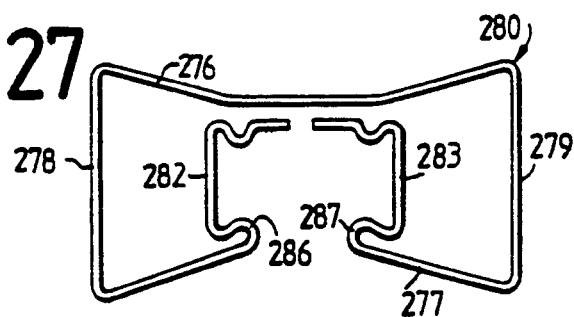
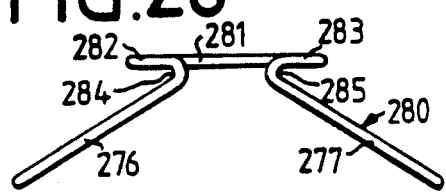

HOLDING DOWN SPRING FOR SPOT-TYPE DISC BRAKES AND ASSOCIATED HOUSING AND BRAKE SHOES

The invention is related to the support of brake shoes in disc brakes by hold down springs, the springs being preferably retained detachably in the brake housing caliper.

Brake shoes are generally supported on guides and reaction forces are transmitted from the brake shoe via the guides to the vehicle frame. As a rule, a clearance is provided between the guides and the brake shoe in order to make sure that the brake shoe may slide towards and away from the brake disc during actuation and release of the brake. In order to prevent any rattling noise of the brake shoe on the guides, springs have previously been used which are fixed to brake shoes and prestress them against their guides.

The prior art hold down springs create problems during assembly or disassembly of the brake calipers, such as when changing the brake linings. If the prior-art hold down springs are firmly fixed to the linings, they cannot be reused or else the springs must be especially unmounted from the linings and afterward reassembled onto the new linings. A loss of the springs may occur when separated from the linings.

A leaf-type spring mounted in the housing cover is known from the German patent application published without examination, No. 2,345,733, which describes the spring as detachably mounted in the housing and secured against falling out. Since the spring utilized there is adapted to engage the brake shoe in radial direction only by arms being positioned relatively widely apart, it is comparatively bulky.

A brake shoe spring is also known from the published European patent application with search report, No. EP-A1-0,203,841. The brake shoe spring is described as retained within a brake housing and is formed with two legs of which a first leg acts elastically in tangential direction on a first projection and a second leg elastically in radial direction on a second projection of the brake shoe. The spot-type disc brake composed of brake carrier, brake shoes, brake housing, and spring is preassembled to one unit.

From the European patent specification, No. EP-PS-0,032,462 a rod-type brake shoe spring is known which is retained at the brake caliper. Retaining elements are configured at pad carrier plates of the brake shoes which are in engagement with the brake shoe spring. When the brake caliper is removed from the carrier the friction linings are suspended at the brake caliper through the lining spring. Disadvantageously, a rod-shaped part of the spring extends parallel to the axis and engages both brake shoes so that, as a disadvantage, no difference is made between the individual requirements for the external and the internal brake shoes.

It is, therefore, the object of the invention to indicate a holding down spring detachably retained in the housing which may be manufactured at low cost, offers ease of handling and has a low weight.

It is the object of the invention to configure a simple spring to take account of the individual requirements of the external and of the internal brake shoes. In this context, particularly a compact spring is provided which requires but little mounting space.

The invention has, furthermore, an object to create a brake shoe spring which avoids any clacking noise of the linings at the end of the braking action, in particular, upon a lifting-out of the brake shoe. In addition the brake housing having the spring assembled thereto may be assembled to the brake shoes and as a consequence easy assembly of the brake is enabled.

SUMMARY OF THE INVENTION

A disc brake shoe hold down spring according to the present invention is formed of a pair of connected legs extending in a V-shape, each leg formed with a first wing. The hold down spring is adapted to be easily inserted into an undercut opening in the brake housing by pressing together the V-shaped legs. In this configuration, the external edges of the elastic wings take support in radial direction at the housing walls, whereas the internal edges of said wings come to be abutted against edges of the brake shoes and resist any radial movement of the latter. The undercut opening in the housing is also furnished with abutment surfaces extending in radial direction against which the radial edges of the wings come to be abutted, as a result whereof any axial movement of the spring in resisting the axial movement of the brake shoes is prevented.

Moreover, the swing of the wing plane in respect of the leg plane is of importance for the invention because the elasticity of the spring relative to any radial load caused by the brake shoes will allow to be changed at a great extent. Indeed, assuming wings which are intrinsically rigid, no spring effect at all would exist in the radial direction if the wings were moved into a radial plane; in the event of a swing of the wings into the tangential plane, the spring force would depend on how the wings are fastened to the legs. According to the invention, the two wings are, therefore, disposed inclined in respect of the two planes.

In order to improve the elastic effect of the inventive hold down spring and to obtain an additional support of the spring in radial direction, and also in the axial direction, a second wing is included in each leg. In this context, the spring may be conformed in an optimal way to the shape of the housing by properly shaping the second wings. Preferably, the second wings are disposed between the joining point of the legs and the first wing, so that the edges of the second wing which face the piston can take support at a radial wall defining the cylinder. In this configuration, the second wing may be designed such that it engages the housing only at one point in the radial direction and, as a result, fosters the swinging movement of the first wing thanks to its improved slidability in the tangential direction. Alternatively it will, however, also be possible to adapt the shape of the second wing to the surface of the housing having, for example, ring sector shape, in order in this way to achieve a firmer abutment.

A particularly simple and inexpensive configuration of the inventive spring is as a wire spring. In this way, it will be possible to design the wings as wire loops. Beyond the reduction in weight, this will have the advantage that if the second wings are in the shape of wire loops, these loops form actuating ears engagable with two fingers as in a scissors, and the V-shaped legs can be swung to be parallel to each other for the purpose of assembly. As a result of that swinging movement of the legs, the distance between the two wing sides running in the axial direction will be reduced to such an extent that they may be inserted into the undercut opening in the housing.

Upon releasing of the legs, the wings will move to be abutted against the housing walls with a prestress, so that the spring is retained in the opening.

In this context, it will be particularly expedient to configure the first wings substantially in the shape of a quadrangular wire loop because in that case edges running in a straight line will be attained for abutment within the housing (axial and radial directions) and to act as a guide for the brake shoes.

The first wing loops are preferably not closed to obtain an increase in the spring effect, since it is insured that the two axially extending wire sections in each step thereby may bend in respect of each other to thereby the spring effect. In this manner, the wings will become intrinsically elastic. It may be sufficient in this respect that the wire loop has wire sections only on three sides. In this case, the fourth section may be utilized in addition for the radial support of the spring by bending it in an appropriate way.

An improvement of the spring effect when swinging the legs in respect of each other is achieved by joining the legs by an open wire loop, since in that case the spring bending is distributed over a larger wire length.

The connecting wire loop is preferably round, since in thus case, the bending forces exerted by the legs will be distributed in a particularly uniform way. Also, the rounded shape of the connecting loop will facilitate the insertion of the spring end into an opening.

In order to optimize the effect of the spring, the invention proposes a brake housing which has recesses undercut in a radial direction to receive the wings of the hold down spring. The recesses having a V-shaped cross section have proved to be of advantage, extending axially, the peak of the V pointing radially outwardly. The presence of the sides of the V limits the swinging movement of the first wings, the external sections of each first wing in abutment against the peak of the associated V.

The recesses are preferably cast into the housing.

A slot intermediate the recesses is formed into the exterior of the housing in order to locate the connecting loop and spring radially. It is preferred that the slot be open radially outwardly in order to not confine the joined end of the spring and thus to improve the elasticity of the spring in the radial direction. Indeed, if and when the leg end introduced into the opening is allowed to evade radially outwardly, then at the same time the elasticity of the spring in the radial direction will increase for this purpose.

In another embodiment, the spring legs each have sections with different angles of inclination for the external and the internal brake shoes, so that the relative movement of the internal brake show in respect of the brake housing and a relative immobility of the external brake shoe in respect of the housing are taken account of. The problem of accommodating the different carrier motions is resolved in this embodiment by means of the spring leg varying angle sections being jointly with an appropriate design of the pad carriers.

In a another aspect of the invention an intermediate part is envisaged between the two functional ranges which is supported in the secant direction (circumferential direction). In this way the spring is secured with the intermediate part to the brake housing so that the movements of the brake shoes act only on the functional ranges of the spring which are associated with them and do not affect one another. Simultaneously, the brake shoe spring is clamped within the housing.

If and when the intermediate part is fixed in both circumferential directions, then a safe fixation will result for the intermediate part and for the spring as a whole.

In one embodiment the external functional range for the external brake shoe ends in a free end extending at an inclination in respect of the wheel axis. The external brake shoe is, thus, safely fixed at the external housing leg.

In an advantageous manner the internal functional range extends, with a leg running at an inclination in respect of the wheel axis, from that wall of the actuating housing which faces the brake disc up to beyond the brake disc. It is safeguarded by said inclination that the brake shoe swings away from the brake disc and that a slight relative movement back toward the piston is rendered possible. Moreover, a relative movement in the event of wear of the brake lining is taken account of by the axial extension.

In one manner, the brake shoe spring is configured symmetrically, so that two functional ranges are provided for the external brake shoe and two functional ranges for the internal brake shoe. Thus, equal spring forces at circumferentially external ranges will result on the brake shoes with functional ranges which are spaced in circumferential direction.

With a free end and leg positioned level with each other, the internal and the external brake shoes may be configured identically, so that in the interest of alleviating the stock requirements, identical brake shoes are provided both for the internal and for the external sides.

In one embodiment, the brake shoe spring is formed with a loop which projects through a guide of the housing and which takes support radially from the outside at the external housing wall of the brake housing so that there is a radial securing means.

In another embodiment, a defined position of the brake shoe spring is attained by an axial prestressing force, so that the brake shoe spring is clampable between the external and the internal housing walls of the external and the internal legs (housing leg and actuating leg).

If the spring is one part, then a firm seat will result in the housing and not at the pad carrier. The spring will be easy to handle and will afford a good balance of tolerances.

A protective means is sought also for the brake shoe as such whose carrier plate is furnished with a groove being open outwardly in radial direction for an advantageous accommodation of a rod-shaped part.

The groove serves to dampen the movement of the brake shoe in the circumferential direction and, as a consequence, to prevent a clacking noise of the linings.

Furthermore, protection is sought for the brake housing which for the purpose of a safe fixation is, advantageously, provided with projections at a radially inwardly positioned side of the bridge section for the accommodation of the brake shoe spring. The brake shoe spring is secured inwardly in the radial direction by undercuts of the projections.

According to another embodiment, the spring is supported in such a manner at the brake shoe that in the event of a swinging movement of the brake shoe the brake shoe is guided while being frictionally engaged by the spring. Frictionally engaged surfaces are, thus, envisaged at the brake shoe, and respectively at the spring, which slide with friction in respect of each other and which dampen the impact of the brake shoe on the carrier arm after a radial lifting-out of the brake shoe. This affects, in particular, the internal brake shoe which, unlike the external brake shoe, is not guided at the brake housing.

In a simple-design manner, the spring is configured as a central spring with a central section with which the spring is retained in a guide of the housing. The spring is, thus, positioned in a location from which the spring is capable of acting concentrically and on both brake shoes.

When the spring is formed with a leg extending substantially in circumferential direction, then a smooth, flat line of force of the spring may be achieved for the radial direction. The spring force will, thus, be dissipatable by friction.

In an advantageous manner, the spring leg is furnished with an S-shaped section so that the spring leg yields elastically in circumferential direction in order to avoid a clacking noise of the lining or in order to ensure a balance in length.

In an advantageous manner, the spring and the brake shoe are provided with cylindrical surfaces which dampen by frictional engagement a relative movement between the two which takes place as a rotational motion.

In a simple-design embodiment the spring is furnished with an external cylindrical surface which is in abutment against the brake shoe. The external cylindrical surface may easily be fabricated by bending of the spring.

Advantageously, an internal cylindrical surface at the brake shoe may be fabricated by a simple punching-out of material at the carrier plate, or by a simple build-up of material onto the carrier plate.

The carrier plate attachments of the brake shoes are formed with two projections which extend in opposite direction circumferentially and which are encircled tong-like by the ends of the spring legs. This bears the advantage that in removing the caliper, the spring encircles the brake shoes tong-like and the brake housing together with the spring and the brake shoes will be removable from the integrated steering knuckle.

With a radially outwardly directed curvature of the spring leg the projection extending in circumferential direction is, advantageously, kept free during the rotational motion before the latter engages in a positive locking in the rotational motion.

In a simple-design manner, the spring is configured symmetrically in respect of an axis of symmetry of the spot-type disc brake so that in the event of an incipient braking action the spring will avoid a clacking noise of the lining both during forward driving and during backward driving.

In a further advantageous embodiment of the invention the spring is configured symmetrically in respect of a radial plane which is positioned offset in parallel direction in respect of the brake disc so that, advantageously, the spring is insertable at an angle of 0 degrees, or of 180 degrees. An easy assembly is, thus, rendered possible.

In another advantageous embodiment, the spring is configured asymmetrically so that the internal brake shoe moving relative to the housing and the non-moving external brake shoe are taken account of.

In an advantageous manner the spring is designed in the shape of a leaf spring which may be manufactured as a simple stamping from 0.6 mm or 0.8 mm thick sheet steel.

In another embodiment, the spring is configured as a wire spring which, advantageously, is bendable into a desired shape. A cylindrical surface is predetermined on account of the circular cross section of a wire spring.

If and when the central section is formed with a loop-shaped section, then the central section will, advantageously, may be compressed together in the circumferential direction, so that the spring is snappable into the guide, also called bridge opening, of fist-type caliper. Simultaneously, said loop serves to balance tolerances in the interest of an easy assembly.

In an advantageous manner, the end of the spring leg is rolled together in respect of a parallel line of the axis so that the rolled end is elastically abuttable against the stop.

Advantageously, the spring leg section is lockable behind an attachment of a brake shoe. When the brake carrier and the steering knuckle are designed one-part in the shape of an integrated steering knuckle, then upon fitting on an assembly line the brake disc will be mounted to the axle under radially extending arms of the steering knuckle, there-upon the brake shoes will be applied radially onto the brake carrier arms and subsequently the housing together with the spring will be put on over the brake disc and the brake shoes. During this procedure, the spring leg sections will slide over a circumferential surface extending substantially in secant direction and the spring legs will be spread apart before the leg sections become detachably locked behind the carrier plate attachments of the brake shoes and come to butt against the carrier plate attachment of the brake shoe. In this way, a clacking noise of the linings will be avoided under any operating condition, that is to say, the striking of the brake shoes against the brake carrier in circumferential direction during the incipient braking action.

Embodiments of the invention will be illustrated in the following with reference to the accompanying drawing.

DESCRIPTION OF THE DRAWINGS

FIG. 1 is a plan view of a first embodiment of the inventive spring in the untensioned condition.

FIG. 2 is a side elevational view of the spring in FIG. 1.

FIG. 3 is a sectional view of the spring taken along the line A—A.

FIG. 4 is a plan view of the spring shown in FIG. 1 in the relaxed condition.

FIG. 5 is a fragmentary broken away perspective view of a brake housing showing the incorporation of a hold down spring according to the invention into the housing of a floating-caliper spot-type disc brake.

FIG. 14 is a plan view of another form of the spring according to the present invention.

FIG. 15 is a side view of the spring shown in FIG. 15 in a cross-section taken along the line XV—XV in FIG. 14.

FIG. 26 is a fragmentary front view of one leg of the wire spring shown in FIG. 25 engaging the carrier plate.

FIG. 27 is a plan view of a second form of the wire spring of FIG. 25.

FIG. 28 is a side view of the wire spring shown in FIG. 27.

FIG. 29 is a side view of a prestressed rolled sheet steel form of spring showing the leg section engaging the carrier plate.

FIG. 30 is a plan view of the prestressed sheet steel spring shown in FIG. 29 engaging the carrier plates.

DETAILED DESCRIPTION

Figure 6:
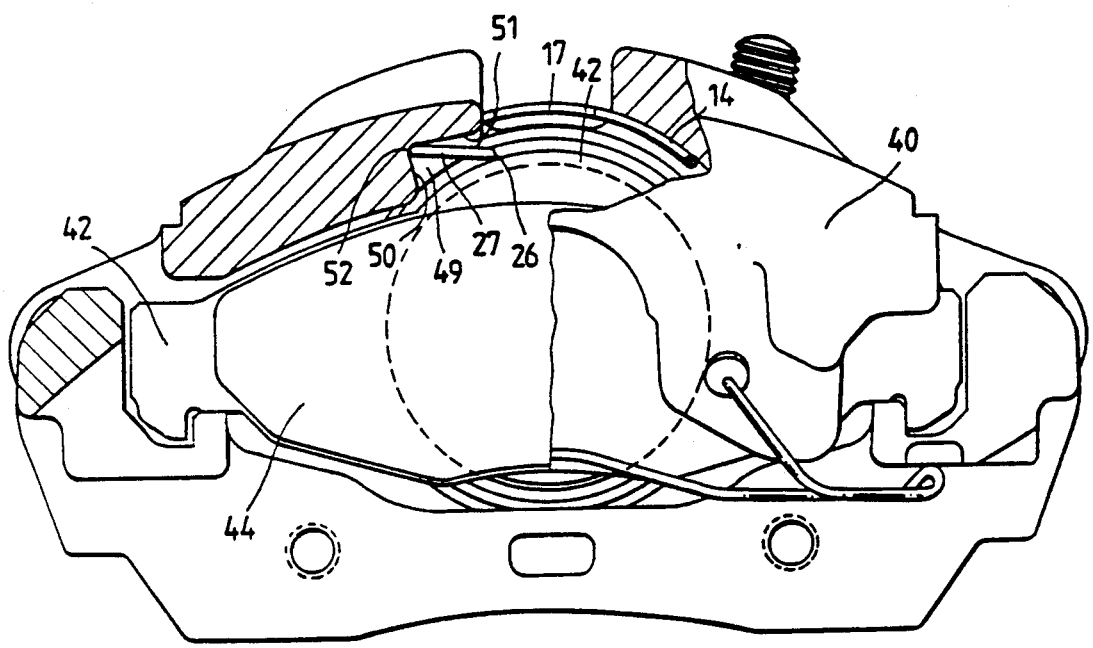
FIG. 6 is a partially sectioned view of a floating caliper as viewed from the outside in the direction of the piston, with a hold down spring assembled therein.

In the Figures, identical components or components corresponding to one another are given identical reference numerals for better clearness.

In FIG. 1, the inventive holding down spring 2 is seen, which is comprised of two legs 4 and 6. Said two legs run together toward to a joining point 16 which is formed by a circular wire loop.

Each of the legs 4 and 6, have a first wing 8, 10, and a second wing 12, 14 formed therein.

As will be appreciated from FIGS. 2 and 3, wing 10 is inclined starting from the outer edge toward the center line of the spring. The inclination may very well be more pronounced than that shown in the drawing, and it contributes in determining the elastic behavior of the spring in respect of a radial load at the inner side of the wings. What is said above regarding the wing 10 applies analogously also for the wing 8.

Both first wings 8, 10 are configured in the shape of substantially quadrangular wire loops. Alternatively, the inventive spring 2 may be set up in the shape of a coil spring, the relevant wings being molded or fixed to the associated legs. A leaf spring of this kind, which may as well be made one piece, is also contemplated as being within the scope of the present invention.

Each of the wire loops 8, 10 being substantially quadrangular, are composed of the wire sections 20 to 23 of the wing 10 which are disposed parallel to each other in pairs, as are the wire sections 26 to 29 of the wing 8.

As will be seen from the wire section 23, the quadrangular wire loop 10 is not completely closed. In this way, an increased spring effect of the two sections 22 and 23 will be achieved which may be elastically deflected at an angle in respect of each other. This applies to sections 28, 29 of the wing 8.

The second wings 12 and 14 are each formed by wire sections 34, 36 and 30, 31 respectively, which are substantially disposed at an angle in respect of each other. The angular position of the wire sections 30, 31, and respectively 34, 36, creates a higher elasticity of the spring in the axial direction, that is to say, an easier slidability of the wire sections 21, 31, respectively 27, 36, relative each other. As a result, it will be easier to accommodate tolerances within the housing.

As will be noted from FIG. 3, beyond the foregoing, the wire sections 30, 34 also are formed with an intermediate bend. In this way, an adaptation of the surface of the wire sections to the shape of the housing is achieved in order to obtain an improved support and in order to guarantee the free mobility of the piston protection cap. As an alternative, the wings 12, 14 may be formed such that they take support at the housing only with their end points, increasing in this way the elasticity of the spring in radial direction.

As will be appreciated viewing FIG. 1 in comparison with FIGS. 2 and 3, the joining point 16 is offset in respect of the level of the legs 4, 6 so that a surface of abutment with the housing originates through the wire sections 31, 36, as a result whereof the spring can take support in axial direction, that is to say, in particular in the direction toward the joining point 16. The difference in level between the legs 4, 6, on one hand, and the joining point 16, on the other hand, is, moreover, caused by the wings 8, 10 taking support in radial direction at the inside surface of the housing, whereas the joining point 16 rests on the housing. For more details in this regard see FIG. 5. In this configuration, the joining point 16 rests on the housing only when the housing is open. When the spring is loaded by the brake shoes, then the joining point 16 will be lifted upward and the transmission of the forces will take place through the wings 12 and 14 (as well as through wings 8 and 10, too).

FIG. 4 shows the inventive spring in the disassembled condition, that is to say, before its installation in the brake housing. In this condition, the two legs 4, 6 are swung in respect of each other forming an angle with their ends. For the assembly of the spring, the two wings 8 and 10 which are open inside are gripped with the fingers and swung toward each other to a degree that the distance of the wire sections 22, 28 (pl. see FIG. 1) becomes sufficient to insert the spring into an undercut opening in the housing. Subsequently, the two legs 6, 4 will swing apart again until the wire sections 22, 28 come to be abutted against associated guide surfaces in the housing, as a result whereof the spring 2 retains itself within said housing. In this position, the two legs 4, 6 extend roughly parallel.

FIG. 5 shows a slightly modified holding down spring assembled into a brake housing 40. The matter is about a floating caliper in this case, the spring supporting only the lining which is actuated directly. It goes without saying that the invention may just as well be successfully applied for fixed caliper brakes or support both brake shoes 43, 44 by making catch at the associated backplates 41, 42. As will be seen from FIG. 5, the legs 4, 6 are abutted against the edge of the backplate 42 and support the latter in radial direction. Now, the spring is shaped such that thanks to a slight inclination in respect of the axis 46, it exerts in addition an axially directed force also on the backplate 42 in order to urge it away from the brake disc not shown but intermediate brake shoes 43, 44 and toward the piston.

With the external wire sections 28, 22 of its wings 8 and 10 the spring 2 is in abutment against the walls of openings (not shown in the drawing) which are located in the housing 40 which is shown in a cut-away representation. The V-shaped inclination of the wings 8 and 10 in respect of each other which greatly determines the elasticity of the spring in radial direction is of importance. The elastic effect is, furthermore, increased by the opening of the wire loops 8 and 10 which has already been described in connection with FIGS. 1 to 3, the wire sections 23 and 29 allowing moreover to be bent toward the housing in an upward direction in order to boost the spring effect in the radial direction. The wings 12 and 14 take support in radial direction at the housing, the wire sections 36 and 31 coming to be abutted against an annular surface 47 in axial direction. Since in addition also the wire sections 21, 27 (see FIG. 1) take support in axial direction at associated walls of the undercut opening, the axial movement of the spring 2 is, thus, hindered in both directions, as a result whereof the spring 2 cannot even be slid by an axial movement of the brake shoe 44.

The inventive hold down spring is modified in respect of FIGS. 1 to 4 as far as the joining point 16 of the two legs 4 and 6 is concerned, which is configured substantially rectangular-shaped in the embodiment of FIG. 5. In this way, an improved support on the bottom 45 of an open slot having lateral walls 48 is to be achieved. Said open slot is open in axial direction and also in upward direction radially so that the bottom 45 defines an outer surface of the housing 40. Beyond a reduced weight and casting technique simplifications, the opening being open in upward direction has the advantage that the joining point 17 is free in an upward direction or radially and this increases the elasticity of the spring in that direction.

FIG. 6 shows a partly sectioned and cut-away representation of a floating caliper brake as viewed from the outside in the direction of the piston. In this configuration, the undercut recess 49 with its two walls 50, 51 being inclined to be V-shaped in respect to each other and which join each other in the corner 52 is of essence for the invention. The external wire section 28 (see FIG. 1) of the spring is abutted against the corner 52. In the event of a radial movement of the brake shoe 44, the wing 8 will, thus, swing about the edge 52 in an upward direction, the wing 12 further elastically cushioning the movement of the brake shoe.

In FIG. 6, the contour of the backplate can be seen. Advantageously, at least the piston-side backplate is designed in such a way that a projection in the range of the spring (being crescent-shaped in this case) supports the latter radially at the level of the outer diameter of the piston protection cap in order to safeguard without obstacle the stroke of the protection cap in the event of a wear of the lining.

Figure 7:
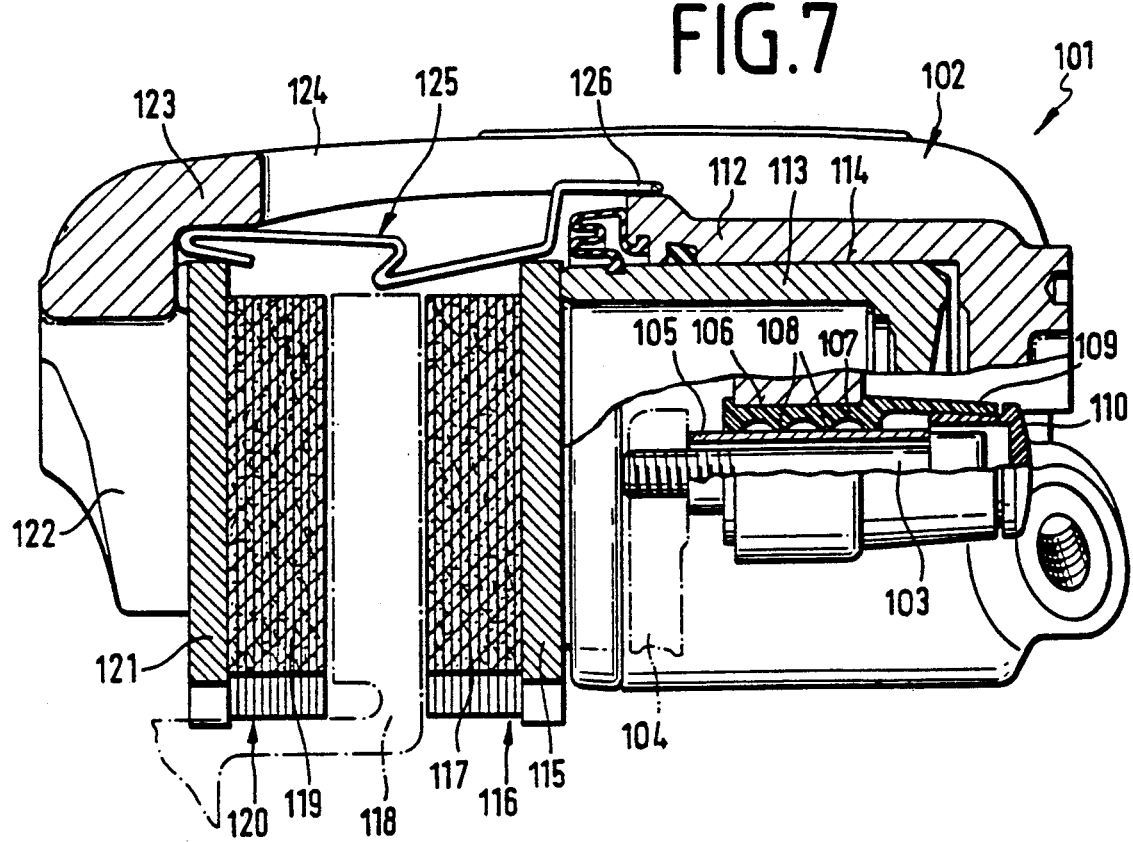
FIG. 7 is a partly sectioned side view of a spot-type disc brake with a central spring.
Figure 8:
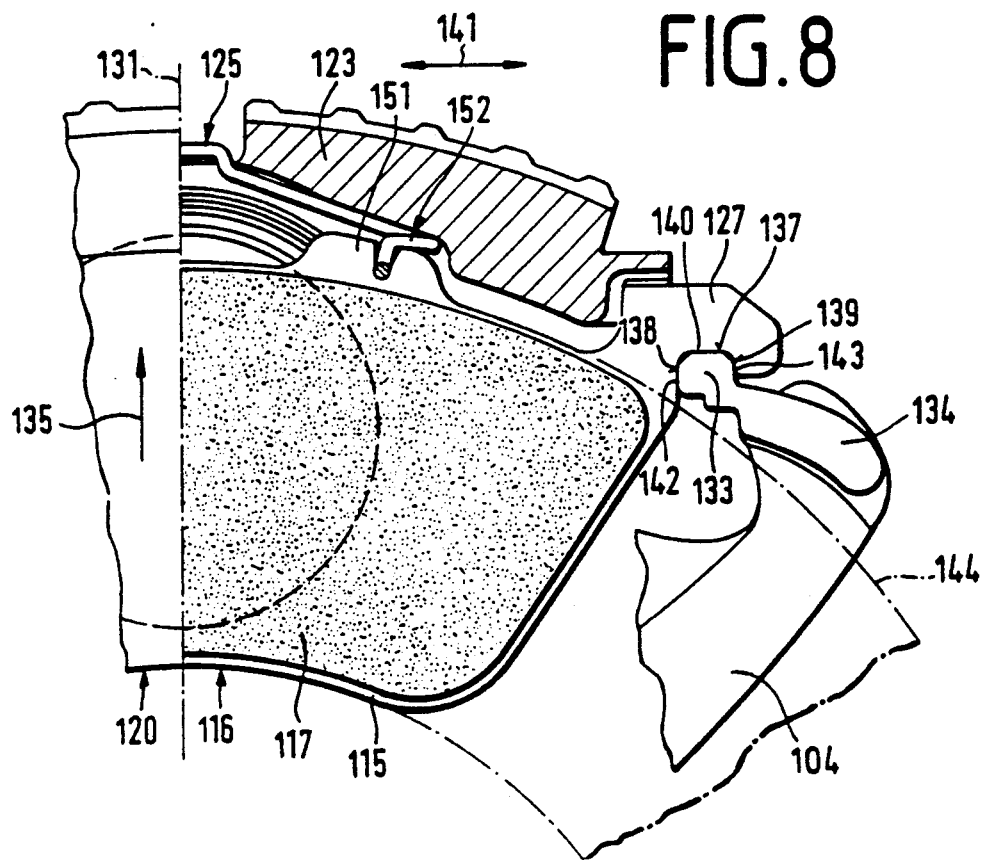
FIG. 8 is a partly sectioned front view of the spot-type disc brake shown in FIG. 7.

FIGS. 7 and 8 show a spot-type disc brake 101 with a U-shaped brake housing 102. A pin 103 is screwed into a brake shoe 104 and is surrounded by a protective bushing 105 which is defined axially at the brake carrier by the pin 103. The pin 103 and the protective bushing 105 extend through a guide bore 106 of the brake housing 102. An elastic guide and damping bushing 107 surrounds the protective bushing 105, and with the aid of its ribs 108 it centers the pin 103 concentrically in the opening 106 of the brake housing 102. An axial extension 109 of the damping bushing 107 serves to accommodate a protection cap 110. The brake housing 102 is symmetrically supported at the brake carrier 104 through guides 103, constituted by pin bushing 105, and damping bushing 107.

Within an actuating housing 112 of the brake housing 102 a piston 113 of an actuating device 113, 114 is supported so as to be slidable within a cylinder 114. The piston 113 presses directly against a carrier plate 115 of a brake shoe 116 which with a friction lining 117 is, thus, being abutted against a first side of a brake disc 118. By means of the force of reaction of the brake housing 102 a friction lining 119 of a second brake shoe 120 is urged against the other side of the brake disc 118. During this procedure, an external leg 122 comes to be abutted against a carrier plate 121 of the brake shoe 120.

The brake housing 102 is substantially comprised of the external leg 122, of a bridge section 123 and of the actuating housing 112. A guide 124 in the bridge section 123 accommodates a central spring 125, also called guide, wire, holding down or brake shoe spring. A loop 126 of the brake shoe spring 125 rests on the actuating housing 112 at the radially external side. Both shoes 116, 120 are furnished with tangential ends 127 which because of the symmetry of the brake shoes in respect of an axis of symmetry 131 are mirror images of each other. The brake shoe ends 127 of the external and of the internal brake shoes 116, 120 rest on a radially outwardly jutting projection 133 of a first brake carrier arm 134.

On account of the symmetry of the spot-type disc brake 101 in respect of the axis of symmetry 131, only that part will be described in more detail which is shown on the right in the drawing with the brake shoe end 127 and the carrier arm 133. The attachment 133 extends axially parallel to the center line of the piston and over a sufficient length that the brake shoe ends 127 arranged opposite each other and making part both of the external and of the internal brake shoes 116, 120 rest on the same attachment 133. The arrangement of the brake shoe in respect of the abutment surfaces and of the guide surfaces is identical as regards the brake shoe ends being spaced apart in circumferential direction, so that the undermentioned description may be limited to the radial projection 133 and to the brake shoe end 127, since the description holds good all the same for the attachment 133 which is disposed opposite in circumferential direction and configured as a mirror image on either side of the axis of symmetry. The brake shoe end 127 is formed with a groove 137 which is directed radially inwardly and is defined by groove surfaces 138, 139 in circumferential direction and by a base surface 140 in radially upward direction. Said base surface 140 rests on the radial attachment 133 of the brake carrier arm 134. During actuation of the brake, said groove surfaces 138, 139 come in contact with attachment surfaces 142, 143 of the radial attachment 133 which point in secant direction 141, respectively extend in radial direction 135, and for that matter, in such a way that a pull/push-type operation is ensured.

That is to say, the clearances in the groove between the attachment are dimensioned such that the brake shoe comes in contact with the brake carrier arm initially on the entering side and thereupon on the leaving side, so that the brake shoe will initially be dragged and then be pushed in order advantageously to safeguard a uniform wear of the friction lining.

The brake carrier 104 is designed one-part with the steering knuckle and is called an integrated steering knuckle. The brake carrier arms 134 extend axially across the brake disc and are disposed radially outside the brake disc circumference 144.

Figure 9:
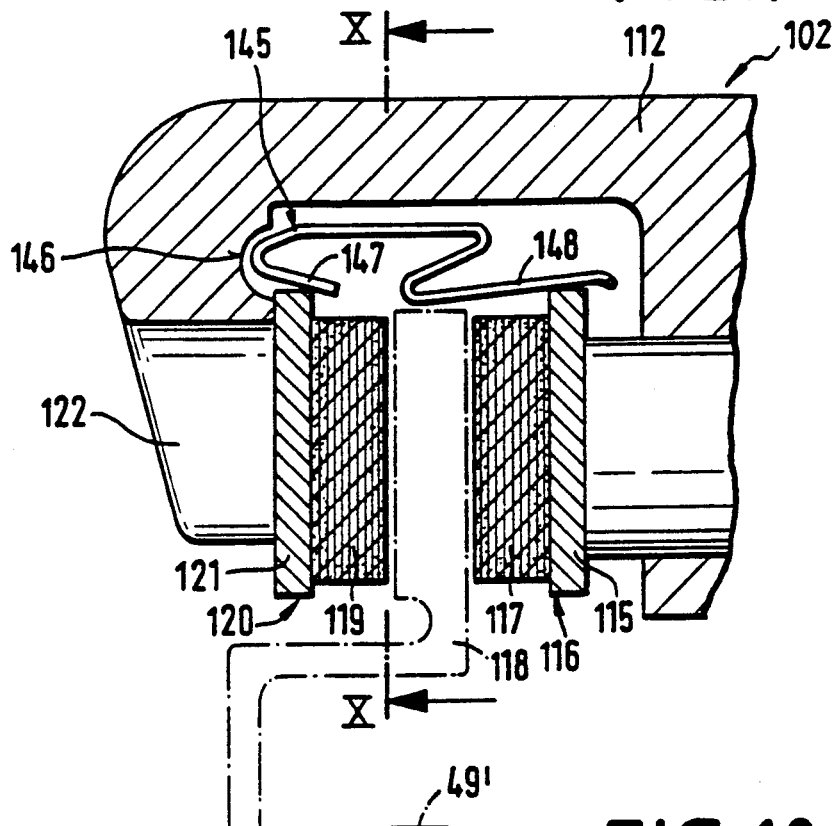
FIG. 9 is a brake housing with a second embodiment of the spring according to the present invention.
Figure 10:
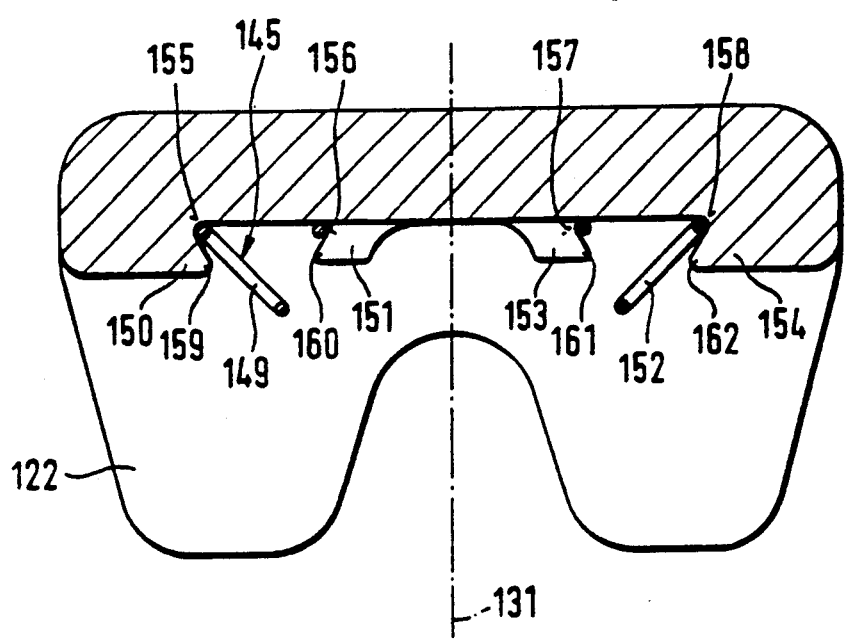
FIG. 10 shows the brake housing with the spring in a cross-sectional representation along the line X—X in FIG. 9.

FIGS. 9, 10 show a spring 145 which is inserted between the leg 122 extending in the shape of a radial wall and the actuating housing 112 extending in the shape of a radial wall. An undercut 146 serves for snapping in the spring and for balancing tolerances and/or the length. The functional range sections 147, 148 for the external brake shoe 120 and for the internal brake shoe 116 are each configured inclined to different degrees in respect of a wheel axis 49' so that a ramp effect results which has the aim of urging the brake shoes away from the disc 118. In this context, the external range 147 is more pronouncedly inclined.

FIG. 10 shows the external housing leg 122 with the spring 145 without the brake shoe 120. In this configuration, the spring 145 has a symmetrical design in respect of the axis of symmetry 131 and is abutted with its first spring leg half 149 between two projections 150, 151 and with its second spring leg half 152 between two projections 153, 154. At said projections 151, 153 it takes support axially inwardly in the direction of the axis of symmetry 131 and at said projections 150, 154 outwardly as viewing in circumferential direction. All projections are formed with undercuts 155, 156, 157, and 158 which are defined by tips 159, 160, 161, 162. Said tips 159, 160, 161, 162 point in the direction of each other as far as each spring half 149, 152 is concerned, so that each spring half 149, 152 is compressed in the undercuts. The undercutting thus serves to retain the spring within the housing. The spring may be seated in the as cast shape of the undercuts, so that no machining will be required.

Figure 11:
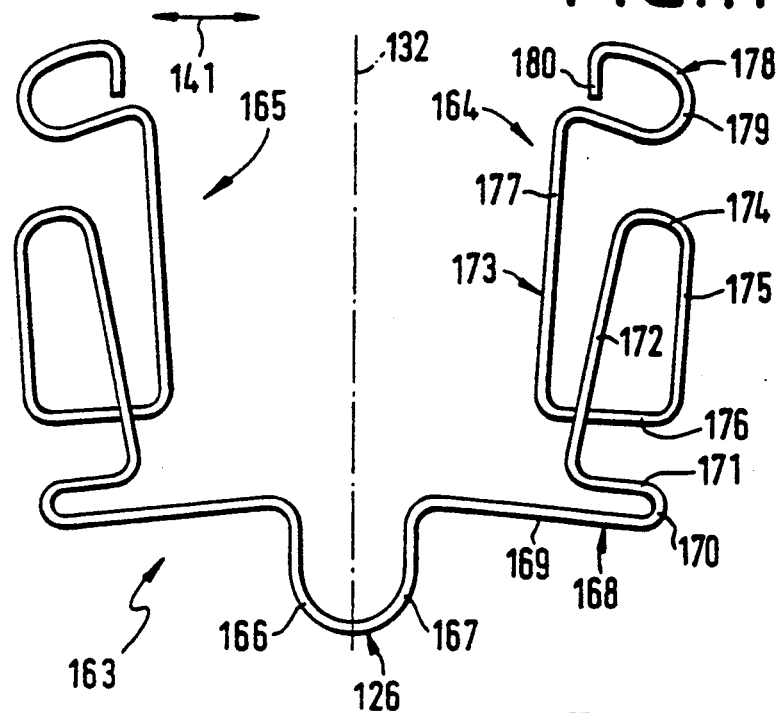
FIG. 11 is a plan view of a third form of the spring according to the present invention.
Figure 13:
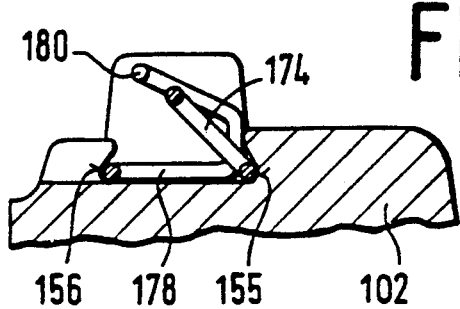
FIG. 13 shows the spring of FIG. 11 sectioned along the line XIII—XIII in FIG. 12.
Figure 12:
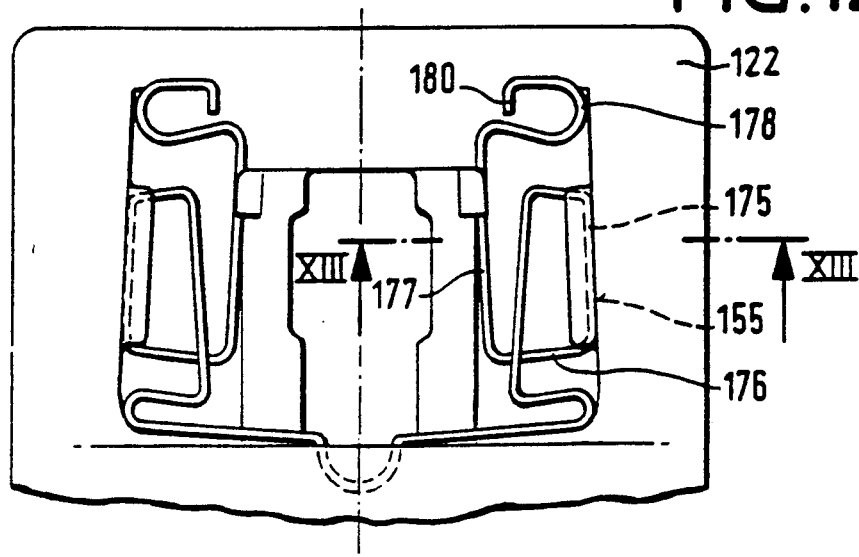
FIG. 12 is a plan view of the spring in FIG. 11 installed in a brake housing.

FIG. 11 shows another form of the spring 163 in the relaxed condition and FIGS. 12 and 13 show the spring 163 incorporated in a housing 102. Since the spring 163 is configured symmetrically in respect of a plane of symmetry with the axes of symmetry 131, 132, the undermentioned description is limited to the right spring leg 164 of the spring which is illustrated in FIG. 11, because the description applies analogously to the second spring leg half 165.

The loop 126 joining the ends of the legs of the spring 163 extends across the axis of symmetry 132 and is, thus, divided into two halves 166, 167. Just like a first leg portion 169 extending in the circumferential direction 141, a second leg portion 171 extending in the circumferential direction 141, a U-shaped connecting loop 170 comprising a second wing and is positioned in between the joined ends loops 126 and the first wing comprised of reversely axially extending segments 172, 175. The brake shoe engaging 172 is succeeded by still another housing engaging segment axially extending and opposite segment 172. A segment 174 is radially inclined and joins the one segment 175 and another segment 172 defining the first wing segment 175. A segment 176 in a circumferential direction connects the still another segment 177 extending an in axial direction and the one segment 175. The segment 177 is succeeded by a final wing 178 having a loop-shaped curve 179 and a free end 180 for engaging the external brake shoe. The segments 175 and 177 are disposed opposite each other circumferentially and may be elastically deflected towards each other in the circumferential direction 141 and are compressed in opposite recess undercuts 155, 156 of the brake housing 102 when installed.

In this configuration, the undercut 155 is trough-shaped. The leg 169 is in abutment in an edge-shaped transitional range between the bridge section 123 and the actuating housing 112. The curve 178 clamps the spring axially between the actuating housing 112 and the external leg 122. The spring 163 is thus held in the housing 102 so as not to get lost. The spring 163 has excellent properties from the ramp effect of the axially inclined another segments 172 engaging the internal brake shoe back plate to move the brake linings 116, 120 away from the disc 118. The functions of the far-side and piston-side cushioning of the linings are neatly separated notwithstanding the one-part design of the spring 163. The spring 163 is easily manufactured of stainless steel (for example, a wire diameter of 1.5 mm). Of course an identical geometry for the far-side and the piston-side brake lining is also possible.

Another spring 181 is shown in FIGS. 14 and 15. This spring 181 is easier to manufacture because it is substantially designed without closed loops, that is to say, not frame-shaped, but only in an non-closed loop shape. The intermediate section loop 182 between the functional ranges 168 and 178 is configured V-shaped with two legs 183, 184 and at the legs 184 with a U-shaped range 185. The support in circumferential direction at the undercuts is realized, on one hand, at the leg 184 and, on the other hand, at the base of the U-shaped range 185. The legs 172, 180 are positioned approximately level with each other in circumferential direction, as a result whereof the brake shoes are interchangeable. The spring legs 164, 165 are disposed at an angle 200 in respect of each other. The loop 185 which takes support at the brake housing 102 is positioned in a plane which is at right angles with the drawing plane. The legs 172, 183, 184 form a second plane which runs at an inclination in respect of the drawing plane. The loop 168 is positioned in a third plane. The two spring legs 164, 165 define a fourth plane.

Figure 16:
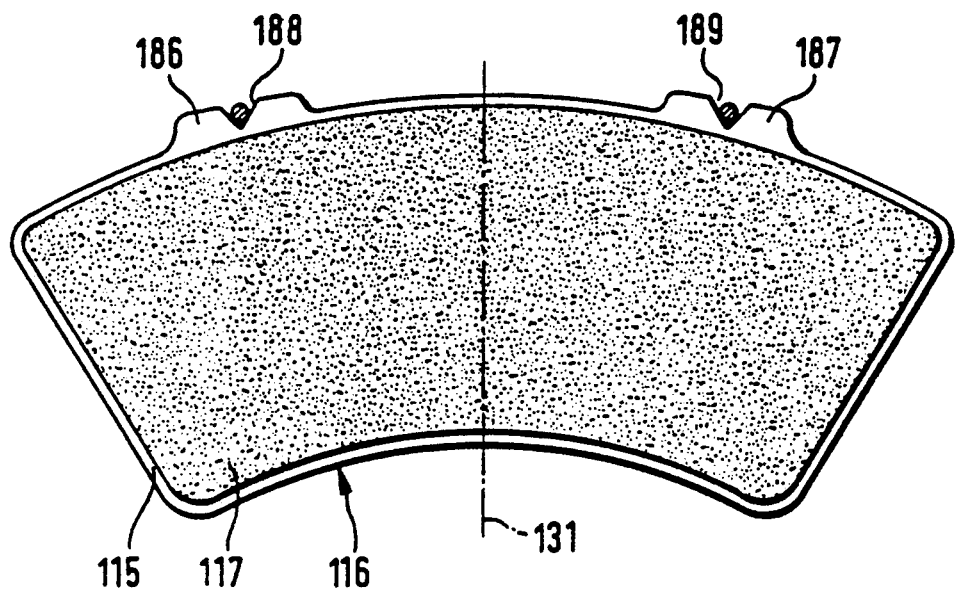
FIG. 16 is a front view of a brake shoe having an engagement feature for receiving portions of the spring according to the present invention.

FIG. 16 shows brake shoe 116 with a friction lining 117 and with a carrier plate 115. The brake shoe 116 is symmetrical in respect of an axis of symmetry 131 and is formed in radially outward direction with two protuberances 186, 187 being spaced from each other in circumferential direction and each of which being furnished with a V-shaped groove 188, 189. Brake shoe 120 is similarly formed. The spring locks in the grooves, with its guide legs 172 and free ends 180, respectively of the functional ranges 168, 178. The brake 116, 120 shoes are safeguarded in this way against rattling noise.

Figure 17:
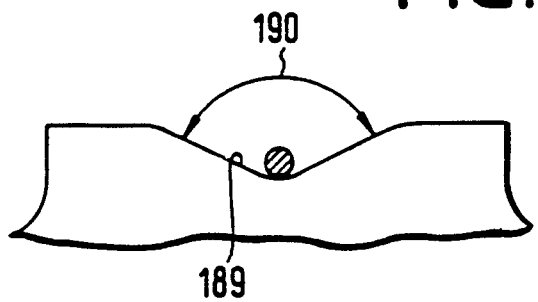
FIG. 17 is an enlarged fragmentary front view of a portion of a brake shoe having a groove engaging the spring.

FIG. 17 shows the groove being rounded off bow-shaped with a large opening angle 190. The large opening angle serves to facilitate the assembly.

Figure 18:
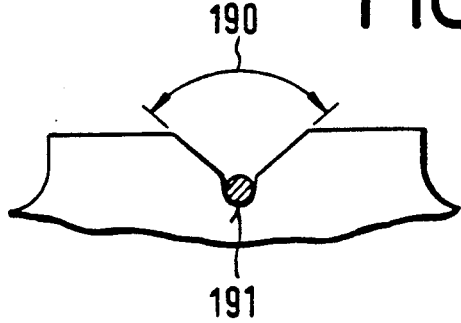
FIG. 18 is an enlarged fragmentary front view of a brake show showing another form of the groove.

FIG. 18 shows a V-shaped groove with a recess 191 positioned in the peak of the V, said recess being adapted to the spring wire diameter of approximately 1.5 mm.

Figure 19:
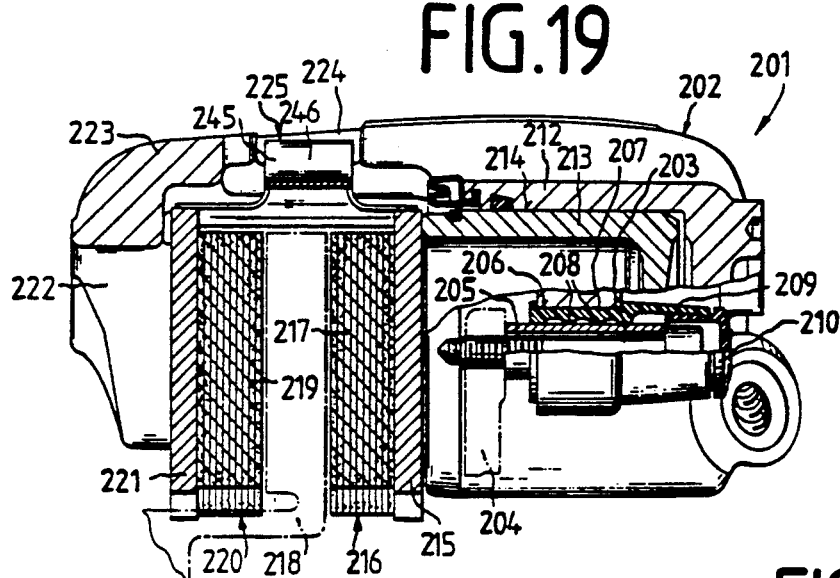
FIG. 19 shows a partly sectioned side view of a spot-type disc brake with another form of the spring according to the present invention.
Figure 21:
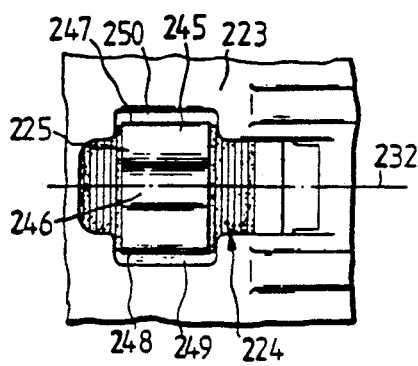
FIG. 21 is a fragmentary top view of the spot-type disc brake shown in FIGS. 19 and 20.
Figure 20:
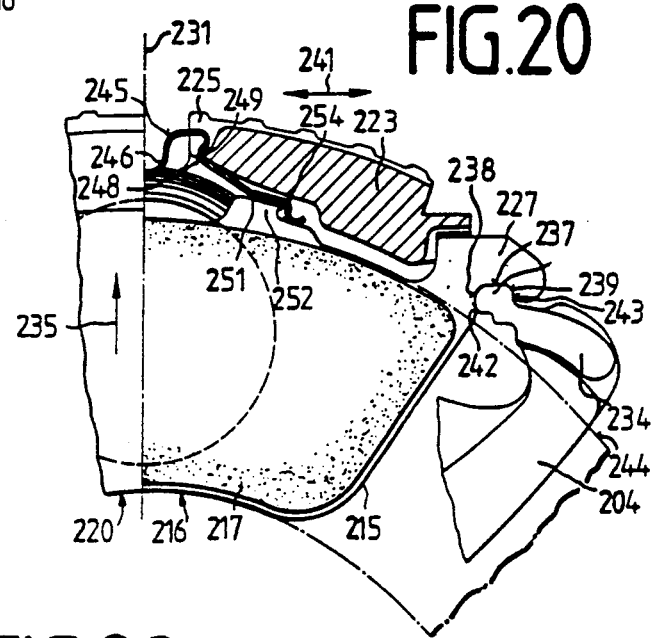
FIG. 20 is a partly sectioned front view of the spot-type disc brake shown in FIG. 19.

FIGS. 19 to 21 show a spot-type disc brake 201 with a U-shaped brake housing 202. A pin 203 is screwed into a brake carrier 204 and surrounded by a protective bushing 205 which is defined axially at the brake carrier by the pin 203. The pin 203 and said protective bushing 205 extend through a guide bore 206 of the brake housing 202. An elastic guide and damping bushing 207 surrounds the protective bushing 205, and with the aid of its ribs 208 it centers the pin 203 concentrically in the opening 206 of the brake housing 202. An axial extension 209 of the damping bushing 207 serves for the accommodation of a protection cap 210. The brake housing 202 is supported symmetrically at the brake carrier 204 through two guides 203, 205, 207 having an identical set-up and being composed of the pin 203, of the protective bushing 205, and of the damping bushing 207.

In an actuating housing 212 of the brake housing 202 a piston 213 of an actuating device 213, 214 is slidingly supported within a cylinder 214. Said piston 213 presses directly against a carrier plate 215 of a brake shoe 216 which together with a friction lining 217 is, thus, brought into abutment against a first side of a brake disc 218. Through the force of reaction of the brake housing 202 a friction lining 219 of a second brake shoe 220 is urged against the other side of the brake disc 218. During this procedure, an external leg 222 comes to be abutted against a carrier plate 221 of the brake shoe 220. The brake housing 202 is comprised in essence of the external leg 222, of a bridge section 223, and of the actuating housing 212.

A guide 224 in the said bridge section 223 accommodates a central spring 225, also called guide spring which may be leaf spring, i.e., strip steel construction as shown, stamped from 0.6 mm or 0.8 mm sheet steel. Both shoes 216, 220 are formed with tangential ends 227 which on account of the identity of the brake shoes are designed identically to each other, and are symmetrical in respect of a plane of symmetry 231, 232. The brake shoe ends 227 of the external and the internal brake shoes 216, 220 rest on a radially outwardly jutting projection 232 of a first brake carrier arm 234.

In view of the symmetry of the spot-type disc brake 201 in respect of the plane of symmetry 231, 232, only that part composed of the brake shoe ends 227 and of the carrier arm 234 will be explained in more detail which is illustrated on the right in the drawing. The attachment 233 extends axially over a sufficient length that the brake shoe ends 227 positioned opposite each other and making part of both brake shoes 216, 220 come to rest on the same attachment 233. The brake shoe ends 227 grip around the attachments 233.

For reasons of simplicity and because of the identity of the brake shoe ends 227, the gripping around will be explained in more detail only making reference to one brake shoe end 227. The brake shoe end 227 is formed with a radially inwardly directed groove 237 which is defined in circumferential direction by groove surfaces 238, 239 and in radially upward direction by a base surface 240. Said base surface 240 rests on the radial attachment 233 of the brake carrier arm 234.

In the event of an actuation of the brake, the groove surfaces 238, 239 come in contact with attachment surfaces 242, 243 of the radial attachment 233 which are directed in secant direction 241, respectively extend in radial direction 235, and for that matter, in such a way that a pull/push operation is ensured. This means that the clearances in the groove between the attachment are dimensioned such that the brake shoe comes in contact with the brake carrier arm initially on the entering side and thereupon comes in contact with the brake carrier arm on the leaving side, so that the brake shoe will initially be dragged and then be pushed in order, advantageously, to safeguard a uniform wear of the friction lining.

The brake carrier 204 is configured one-part with the steering knuckle and is called an integrated steering knuckle. The brake carrier arms 234 extend axially across the brake disc and are positioned radially outside the brake disc circumference 244.

A central section 245 in the middle of said central spring 225 is formed with a loop 246 and with two rounded sections 247, 248 which come in snug contact with projections 249, 250. With the aid of said loop 246, the spring 225 may be compressed in secant direction 241 and inserted into the guide 224 radially from the bottom in such a way that the spring 225 clamps with the aid of its rounded sections 247, 248 at the projections 249, 250 in the guide of the housing 202. The spring 225 is configured symmetrically in respect of the plane 231, 232 and is comprised of two legs 251 which substantially extend in secant direction 241 and of which only one is shown in this instance.

Figure 22:
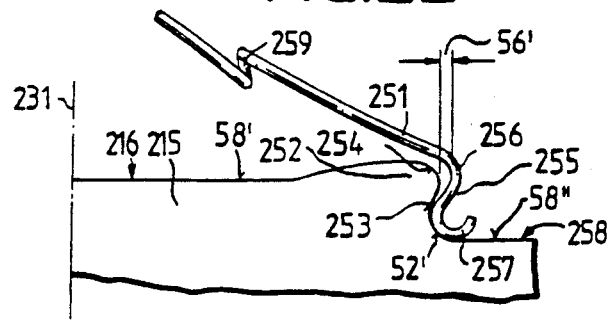
FIG. 22 is a fragmentary front view of one leg of the spring and associated brake shoe.

FIG. 22 shows the leg 251 which extends over a radially projecting attachment 252 at the carrier plate 215 of the brake shoe 216. The attachment 252 is positioned between the axis of symmetry 231 and the brake shoe end 227 and presents a cylindrical surface 253 which points in the direction of said brake shoe end 227 and above which a projection 254 is positioned in radially outward direction which extends in secant direction in respect of the end 227. The spring leg 251 is furnished with an S-shaped spring leg section 255 with an upper loop 256 and a lower loop 257. The lower loop 257 forms a cylindrical section 257 with an outer cylindrical surface which is in abutment against a foot 52 with the cylindrical surface 253 of the radially projecting attachment 252. The upper loop 256 presents the same contour as the attachment 254 of the carrier plate 215 but is spaced from the latter at a distance 56. An S-shaped section 259 brings about an elastic cushioning in secant direction 241 in order to dampen the movement of the friction lining 216 in secant direction 241. The attachment 252 defines two step surfaces 58' and 58" of a circumferential surface 258 extending substantially in secant direction 241 and positioned radially outside. The step surfaces 58', 58" are substantially separated from each other by the cylindrical surface 253. The radially external step surface 58' extends substantially in secant direction 241 and at least so much in the direction of the axis of symmetry 231 that a safe sliding and insertion of the spring 225 are rendered possible. Advantageously, the pad carrier plates 215, 221 are, thus, configured such that in the event of the assembly the two spring legs 251 snap in a positive locking engagement and that in the sprung condition the clacking noise of the lining will be prevented by a friction locking, respectively a positive locking in any operating condition whatsoever.

Figure 23:
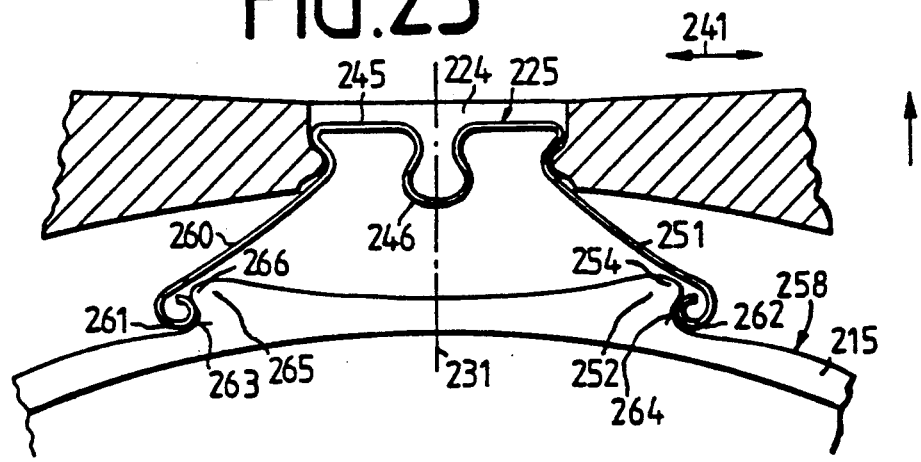
FIG. 23 is a fragmentary front view of another spring according to the present invention, installed in a spot-type disc brake shown in partial section.

FIG. 23 shows the spring 225 inserted in the guide 224. With the aid of the loop 246 the spring is compressible in its center section 245 in secant direction 241 in order to insert it into the guide 224. The legs 251, 260 are formed with leg ends 261, 262 which are rolled inwardly and which engage axially extending semicircular grooves 263, 264, also called undercut or recess, of the carrier plate 215. The grooves 263, 264 are defined by the radially outside surface 253 of the carrier plate 215 and are formed by radially projecting attachments 252, 265 which with projections 254, 266 extending in secant direction 241 jut out in radial direction.

Figure 24:
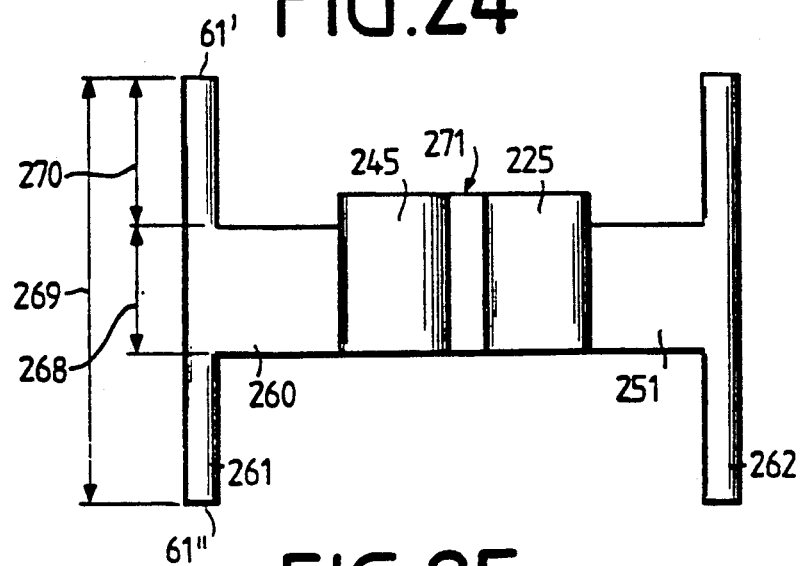
FIG. 24 is a plan view of the spring shown in FIG. 23.

FIG. 24 shows the spring 225 with the central section 245 in the middle and with the spring legs 251, 260 with the rolled spring leg sections 261, 262. The spring legs 251, 260 are configured T-shaped, for the internal brake shoe alone an L-shape would be sufficient. In the range of the central section 245 and of the legs 251, 260, the spring 225 has an axial length 268 which is smaller than an axial length 269 which is occupied by the leg sections 261, 262. In this way, a free space 270 originates along which the internal brake shoe 216 may travel in the event of a wear of the lining. A nose 271 projecting in axial direction ensures the correct installation of the spring 225. Thanks to the free space 270, a spring effect is achievable at the tips 61, 61" in secant direction, as a result whereof the spring 225 is mountable with a prestress. Simultaneously, a torsional effect is achievable through the tips 61, 62" which, advantageously, assists in avoiding the clacking noise of the lining in radial direction.

Figure 25:
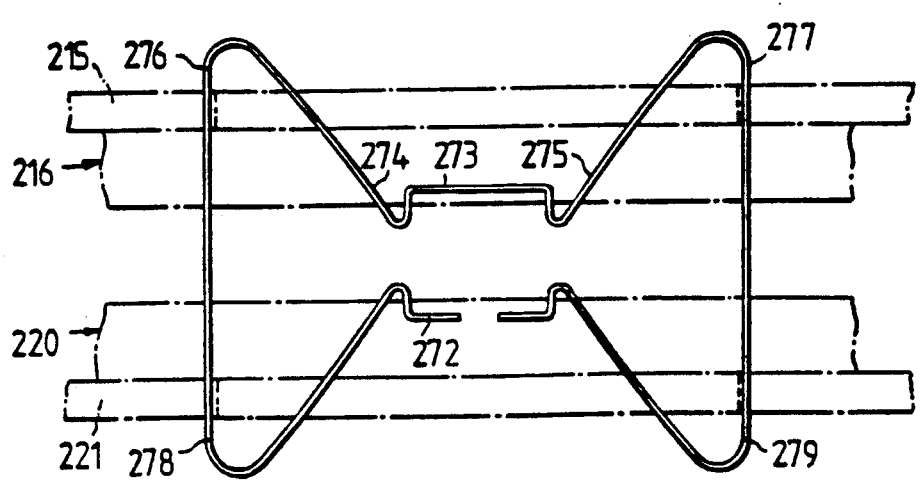
FIG. 25 is a plan view of a wire form of the spring.

FIG. 25 shows a wire spring 272 as applied on the carrier plates 215, 221 of the brake shoes 216, 220. The spring 272 is furnished with a central section 273 starting from which two triangular loops 276, 277 which with their tips 274, 275 point to each other extend in secant direction 241. The loops 276, 277 are each formed with a basic leg 278, 279 which is hookable, respectively suspendible into the grooves 263, 264.

FIG. 26 shows the hooking-up of the leg 279 in the groove 264 of the carrier plate 215.

FIGS. 27 and 28 show a wire spring 280 with the two loops 276, 277 and with the basic legs 278, 279. Between the central section 281 and the loops 276, 277, the spring 280 is furnished with two semicircular transitions 282, 283. These transitions 282, 283 are engaged by the projections 249, 250 of the housing 202 and come to be snugly abutted against the surfaces 284, 285. With the aid of semicircularly curved projections 284, 285, 286, 287 in said central section 281, said central section 281 is compressible in secant direction 241, so that the spring 280 is insertable into the guide 224.

FIG. 29 shows the spring leg 251 curved radially outwardly. The at least partly cylindrical surfaces 292, 293 of the carrier plate 215 and of the spring leg section 262 are disposed coaxially with each other and have an identical radius 294. In the event of the lifting-out of the internal brake shoe 216, said cylindrical surfaces 292, 293 are rotated in respect of each other. On the end of the braking action, the cylindrical surfaces 292, 293 have to perform a rotational movement in the reverse direction, the friction-lock abutment dampening the return movement and, thus, the falling-back of the brake shoe 216 onto the carrier 204.

FIG. 30 shows the spring 225' with its spring leg section 262 prestressed in secant direction as being abutted only against edges 290, 291 of the carrier plates 215, 221, in which configuration the coaxiality does no longer exist.

We claim:

1. A hold down spring arrangement acting on at least one disc brake shoe having a back plate mounted in a brake housing opposite a brake disc, comprising a hold down spring comprising an elongated element having two legs formed therein joined together at one end, said legs extending in the same general direction as the axis of said brake disc but inclined outwardly in a V with respect to each other from said joined ends when in a relaxed condition, and which legs are elastically swingable towards each other;

each of said legs formed with a first wing comprised of a looped shape of said elongated element, each of said first wings including one axially extending segment and another radially spaced opposite segment connected thereto but extending axially in the reverse direction, said housing having undercut recesses, said one segment of each of said first wings engagable in a respective axial undercut recess in said housing while said another opposite segment of said first wing extends generally axially across and in engagement with said back plate of at least one said brake shoe.

2. A spring arrangement as claimed in claim 1, in which each one of said legs is formed with another looped shape adjacent said joined ends comprising a second wing, each of said second wings extending substantially in opposite circumferential directions with respect to said brake disc axis and engaging an inside surface of said housing, said joined ends also engaging an outside surface of said housing, so that said hold down spring is held in said housing by said engagement of said second wings and said joined ends.

3. A spring arrangement as claimed in claim 1 wherein said spring is a wire spring, said legs each comprising a length of wire and said first wings each comprising a wire loop formed in each of said legs.

4. A spring arrangement as claimed in claim 3, in which said first wing comprises a quadrangular wire loop formed in each leg.

5. A spring arrangement as claimed in claim 4 in which each of said first wing wire loops are not closed, said gap positioned such that said one segment of said loop engaging said housing undercut recess is able to be elastically deformed inwardly.

6. A spring arrangement as claimed in claim 1 wherein said joined ends of said legs comprises a wire loop.

7. A spring arrangement as claimed in claim 6 wherein said wire loop formed by said joined ends is in a shape of a circle open in the direction facing said legs.

8. A spring arrangement as claimed in claim 2, said first wing of said hold down spring legs further including an axial slot axially extending with respect to said brake disc axis in said brake housing and receiving said joined ends said legs.

9. A spring arrangement as claimed in claim 8, wherein said axial slot receives said joined ends of said legs to be confined circumferentially.

10. The spring arrangement according to claim 3 wherein each of said first wing loops are oppositely inclined radially with respect to said brake disc axis.

11. The spring arrangement as claimed in claim 1, wherein said first wing loops of said legs are disposed symmetrically with respect to each other.

12. The spring arrangement as claimed in claim 1, wherein said another segment of each of said first wings extend generally axially but at an inclination from the brake disc axis and engaging said brake shoe back plate so as to bias said brake shoe away from said brake disc.

13. The spring arrangement as claimed in claim 12, wherein a pair of brake shoes comprising internal and external brake shoes having respective back plates are mounted in said brake housing, said first wing of each leg engaging said internal brake shoe back plate and wherein a loop succeeding each first wing loop is formed in each leg, said succeeding loops engaging said external brake shoe back plate.

14. The spring arrangement as claimed in claim 1 wherein said housing is formed with a slot and said joined ends of said holding spring projects through said slot in said housing and engages said housing on an outside surface thereof.

15. The holding spring arrangement as claimed in claim 3 wherein said holding spring is axially pre-stressed between axially spaced walls in said housing.

16. The spring arrangement as claimed in claim 3, wherein said wire of said holding spring is spring wire.

17. The spring arrangement as claimed in claim 3, wherein said at least one brake shoe includes a friction lining and a carrier plate, and wherein said carrier plate is formed with a radially outwardly open groove receiving a section of said hold down spring.

18. The spring arrangement according to claim 1 wherein said brake housing includes a bridge section for a floating-caliper spot-type disc brake and wherein a radially inwardly positioned side of the said bridge section is formed with said axial recesses configured to be engaged by said one segment of each of said first wing formed in respective legs of said hold down spring.

19. The spring arrangement as claimed in claim 18, wherein each of said holding spring legs are formed with still another segment of said formed element extending axially and opposite said one segment of said first wing said housing formed with other axial recesses receiving a respective one of said still another segments.

20. The spring arrangement as claimed in claim 18, wherein said brake housing is axially slidingly positioned on a brake carrier comprising an integrated steering knuckle.

* * * * *